(12) United States Patent
Okura et al.

(10) Patent No.: US 7,526,874 B2
(45) Date of Patent: May 5, 2009

(54) SEAT ADJUSTMENT TOOL FOR BICYCLE

(76) Inventors: Michael D. Okura, 1400 North Division Ave., Urbana, IL (US) 61801; Billy B. McNeill, P.O. Box 608, 102 N. Elizabeth St., Tolono, IL (US) 61880

( * ) Notice: Subject to any disclaimer, the term of this patent is extended or adjusted under 35 U.S.C. 154(b) by 0 days.

(21) Appl. No.: 12/071,244

(22) Filed: Feb. 19, 2008

(65) Prior Publication Data
US 2008/0196263 A1 Aug. 21, 2008

Related U.S. Application Data

(60) Provisional application No. 60/902,371, filed on Feb. 21, 2007.

(51) Int. Cl.
*G01B 5/25* (2006.01)
(52) U.S. Cl. .......................... 33/613; 33/373
(58) Field of Classification Search .................. 33/370, 33/371, 372, 373, 486, 487, 488, 613, 645, 33/783, 810, 811, 812
See application file for complete search history.

(56) References Cited

U.S. PATENT DOCUMENTS

| | | | |
|---|---|---|---|
| 535,287 A | 3/1895 | Hill | |
| 3,956,829 A * | 5/1976 | Moxon | 33/203.19 |
| 4,336,656 A | 6/1982 | Lewis | |
| 4,527,337 A * | 7/1985 | Dreiling | 33/613 |
| 5,421,094 A * | 6/1995 | McCord et al. | 33/373 |
| 6,470,591 B2 | 10/2002 | Rutkowski | |
| 6,658,750 B2 | 12/2003 | Scheibner et al. | |
| 6,785,977 B1 * | 9/2004 | Crichton | 33/613 |
| 6,839,976 B2 | 1/2005 | Winkenbach et al. | |
| 2001/0034945 A1 * | 11/2001 | Smochek | 33/373 |
| 2002/0083606 A1 | 7/2002 | Monteil et al. | |
| 2004/0211076 A1 * | 10/2004 | Vicario | 33/613 |

\* cited by examiner

*Primary Examiner*—G. Bradley Bennett
(74) *Attorney, Agent, or Firm*—Richard C. Litman

(57) ABSTRACT

A tool for precisely determining the height and setback of a bicycle seat so that the seat can be adjusted to desired parameters. The tool can also be employed to determine the exact height of a bicycle's frame. The tool includes an adapter member that is attached to the bottom bracket spindle of the bicycle after removal of the crank arm. An elongate measuring pole is attached to the adapter member. Measuring indicia are inscribed on the outer surface of the pole. The measuring pole is provided with two components adjustably positioned along the length of the pole. One component is adapted to attach to the frame of the bicycle. The second component includes an adjustable position rod.

10 Claims, 3 Drawing Sheets

SEAT ADJUSTMENT TOOL FOR BICYCLE

CROSS-REFERENCE TO RELATED APPLICATION

This application claims the benefit of U.S. Provisional Patent Application Ser. No. 60/902,371, filed Feb. 21, 2007.

BACKGROUND OF THE INVENTION

1. Field of the Invention

The present invention generally relates to measuring tools. More specifically, the present invention is drawn to tool for precisely measuring and adjusting the height and setback of a bicycle seat/saddle.

2. Description of the Related Art

Experienced bicyclists are very aware of the "fit" or positioning of the seat of the bicycle relative to the height of the seat (the distance between the top of the seat and the bottom bracket) and the seat setback (the distance of the nose of the seat behind the bottom bracket). In fact, the more avid the cyclist, the more important the preciseness of these seat positions becomes and a variance of a single millimeter affects the feel and performance of the bicycle and the comfort of the cyclist.

Heretofore, seat adjustment has been accomplished by trial and error or by employing a measuring tape to measure the distance from the center of the bicycle's crank arm attachment to the bottom bracket to the top of the seat and adjusting the seat accordingly. The measuring tape is also used to "guesstimate" the seat setback. The trial and error scenario requires painstaking, time-consuming dedication if the seat needs to be readjusted or if attempting to replicate the seat position on a different bicycle. The tape measure scenario is error-prone since the crank arm is laterally spaced from the seat and any measurement must be taken at and angle. If the tape is not angled, the user must "eye" the tape measurement relative to the top of the seat. Because of these physical impediments, measurements taken with a tape have been found to vary by 2-5 millimeters.

As noted above, it is highly improbable and almost impossible to use a tape to replicate the seat position on two or more different bicycles. The art would certainly welcome a tool whereby a cyclist could easily and accurately determine seat height and seat setback relative to the bottom bracket. Thus, a seat adjustment tool for a bicycle solving the aforementioned problems is desired.

SUMMARY OF THE INVENTION

The seat adjustment tool for a bicycle is a tool for precisely determining the height and setback of a bicycle seat so that the seat can be adjusted to desired parameters. The tool can also be employed to determine the exact height of a bicycle's frame. The tool includes an adapter member that is attached to the bottom bracket spindle of the bicycle after removal of the left crank arm if necessary. An elongate measuring pole is attached to the adapter member. Measuring indicia are inscribed on the outer surface of the pole. The measuring pole is provided with two components, which two components are adjustably positioned along the length of the pole. One component is adapted to be attached to the frame of the bicycle. The second component includes an adjustable position rod, which rod is employed at a position to measure either seat height, frame height or seat setback. By attaching directly to the bracket spindle, the tool is able to measure distances at the same angle that the rider's leg hangs down to reach the pedals. Thus more precise measurements can be determined for the height and setback parameters involved.

Accordingly, the invention presents a tool for easily and precisely determining the height of a bicycle seat, a bicycle frame and the setback of the seat. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
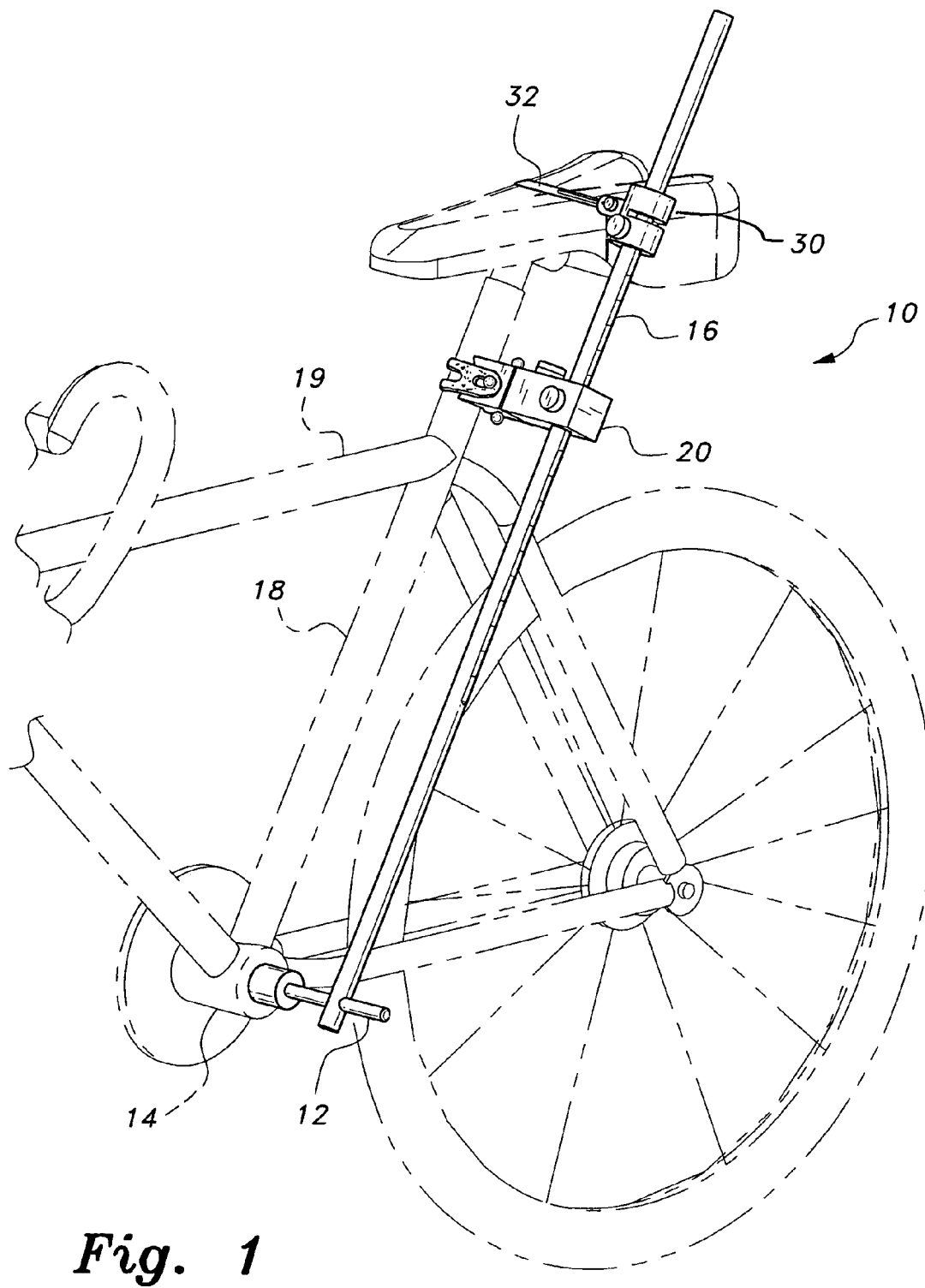
FIG. 1 is an environmental, perspective view of a seat adjustment tool for a bicycle according to the present invention, positioned for determining the height of a bicycle seat.
Figure 2:
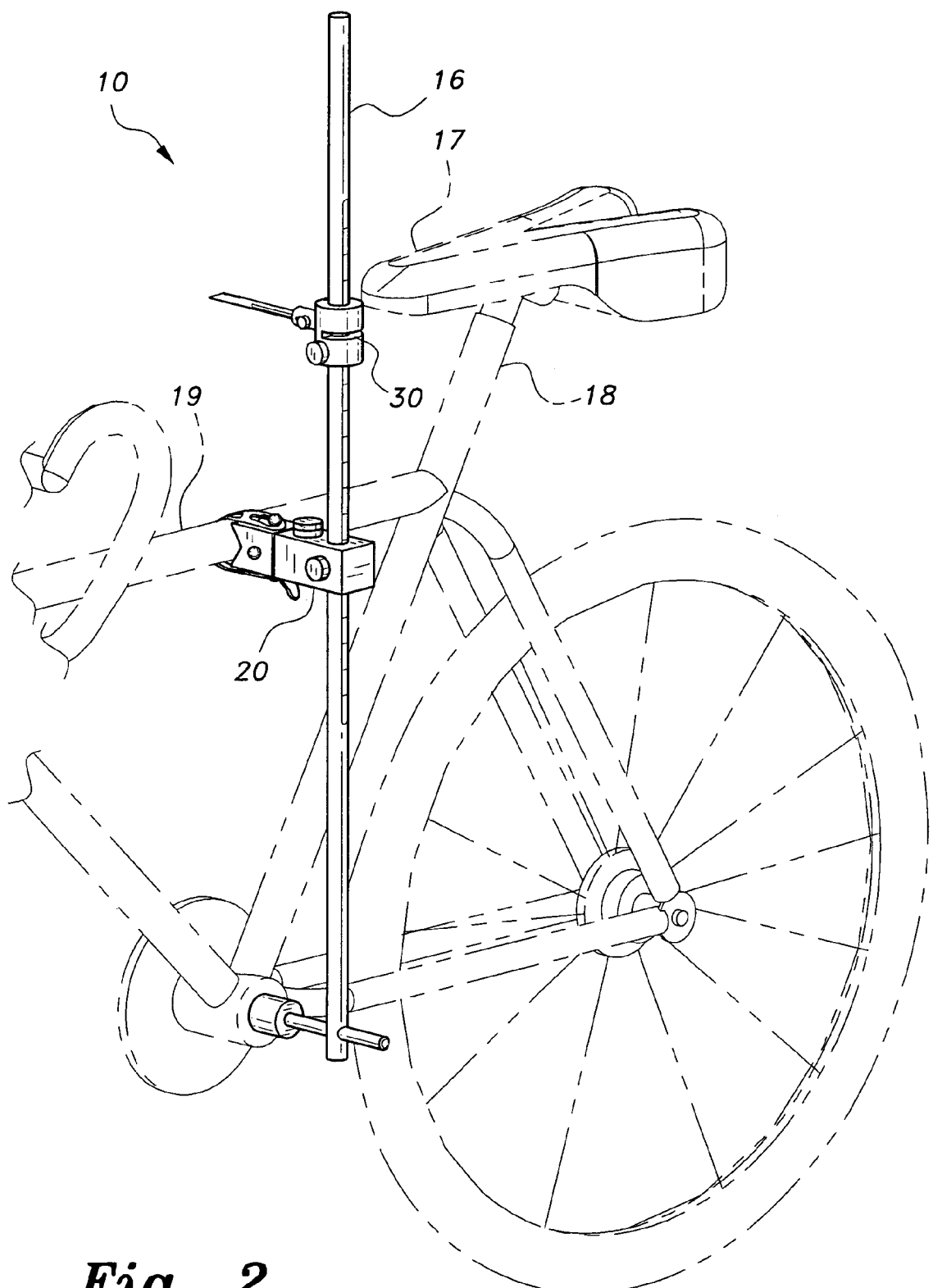
FIG. 2 is an environmental, perspective view of a seat adjustment tool for a bicycle according to the present invention, positioned for determining the bicycle frame height and setback of a bicycle seat.

Attention is first directed to FIGS. 1 and 2 wherein the tool of the invention is generally indicated at 10. Tool 10 comprises an adapter member 12 removably attached to the spindle bracket 14 of a bicycle after the crank arm and pedal (neither shown) have been removed. Adapter member 12 extends outwardly from the spindle bracket and is perpendicular to the bicycle frame. Measuring pole 16 has its lower end removably inserted on adapter member 12. A first component 20 is mounted for sliding movement along the longitudinal axis of pole 16. A second component 30, positioned above component 20, is also mounted for sliding movement along the longitudinal axis of pole 16. A height position rod 32 extends horizontally from component 30. As illustrated in FIG. 1, the tool is deployed to determine the height of the seat and the component 20 is attached to the seat tube 18 of the bicycle. In FIG. 2, the tool is deployed to determine the setback and/or frame height and the component 20 is attached to the top tube 19 of the bicycle.

Figure 3:
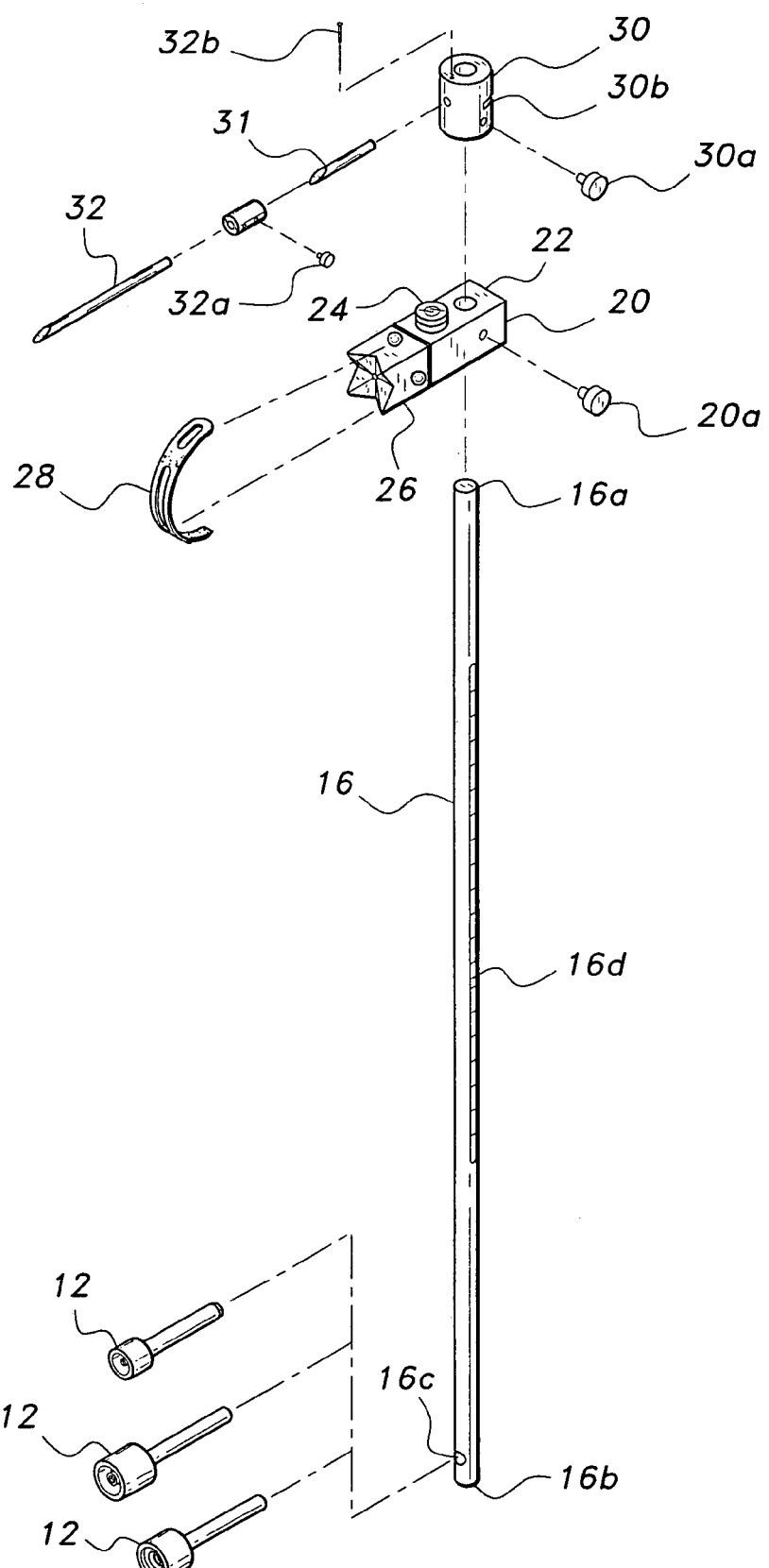
FIG. 3 is an exploded view of a seat adjustment tool for a bicycle according to the present invention.

As best seen in FIG. 3, measuring pole 16 has an upper end 16a and a lower end 16b. An aperture 16c is provided through the pole adjacent lower end 16b whereby the lower end can be inserted on adapter member 12. Measurement indicia 16d are disposed or inscribed on the pole. First component 20 is adapted to encompass pole 16 and comprises an upper surface 22 for supporting a level reading device 24 thereon. A fastening device 26 is rotatably attached to one end of component 20. At least one strap 28 is employed to attach component 20 to the frame of the bicycle. Adjustment screw 20a functions to tighten component 20 to pole 16 in a desired position. Second component 30 is also designed to encompass pole 16. Component 30 is provided with an adjustment screw 30a to tighten component 30 on pole 16. A two-piece position rod 31, 32 extends horizontally from one side of component 30. Rods 31, 32 are connected via a collar that includes an adjustment screw 32a for tightening the rods in a desired position. A securing screw 32b secures rod 32 in component 30. An opening 30b is provided in component 30 in the side diametrically opposite rod 32. Opening 30b overlies indicia 16d. This allows a user to determine a vertical measurement that corresponds to the exact position of rod 32.

The above described tool allows the user to determine the precise distance the top of the seat is positioned above the spindle bracket when the tool is attached to the frame as shown in FIG. 1. Setback is determined by measuring the distance between rod 32 and the nose 17 of the seat as shown in FIG. 2. Frame height is determined by attaching component 20 to seat tube 18 below top tube 19 and bringing rod 32 in abutment with top tube 19. Any suitable material may be employed to fabricate the parts of the tool.

It is to be understood that the present invention is not limited to the embodiment described above, but encompasses any and all embodiments within the scope of the following claims.

We claim:

1. A seat adjustment tool for a bicycle, comprising:
    an elongate measuring pole having a length, an upper end, and a lower end, the pole having an aperture formed therethrough adjacent the lower end;
    an adapter positioned in the aperture for coupling the lower end of the measuring pole to the bicycle;
    measurement indicia disposed along the length of the measuring pole;
    a first component encompassing the measuring pole, the first component having an end and an upper surface, the first component being slidable along the length of the measuring pole;
    a fastening device rotatably coupled to the end of the first component for attaching the first component to the bicycle;
    a second component encompassing the measuring pole, the second component being slidable along the length of the measuring pole;
    a height position rod removably disposed on the second component and extending perpendicularly therefrom; and
    a level indicator disposed on the upper surface of the first component.

2. The seat adjustment tool for a bicycle according to claim 1, wherein said fastening device includes a strap.

3. The seat adjustment tool for a bicycle according to claim 1, wherein said fastening device includes a strap and wherein said first component is positioned below said second component on said measuring pole.

4. The seat adjustment tool for a bicycle according to claim 1, further including a first adjustment screw disposed in said first component for tightening said first component on said measuring pole and a second adjustment screw disposed in said second component for tightening said second component on said measuring pole.

5. The seat adjustment tool for a bicycle according to claim 1, wherein said height positioning rod comprises a two-piece rod having a collar joining the two pieces.

6. A seat adjustment tool for a bicycle, comprising:
    an elongate measuring pole having a length, an upper end, and a lower end, the pole having an aperture formed therethrough adjacent the lower end;
    an adapter positioned in the aperture adapted for coupling the lower end of the measuring pole to the bicycle;
    measurement indicia disposed along the length of the measuring pole;
    a first component encompassing the measuring pole, the first component having an end and upper surface, the first component being slidable along the length of the measuring pole;
    a fastening device rotatably coupled to the end of the first component adapted for attaching the first component to the bicycle, the fastening device including a strap, the strap being removably attached to the fastening device;
    a second component encompassing the measuring pole, the second component being slidable along the length of the measuring pole;
    a two-piece height position rod removably disposed on the second component and extending perpendicularly therefrom;
    a collar joining the two-piece height position rod; and
    a level indicator disposed on the upper surface of the first component.

7. The seat adjustment tool for a bicycle according to claim 6, wherein said first component is positioned below said second component on said measuring pole.

8. The seat adjustment tool for a bicycle according to claim 6, further including a first adjustment screw disposed in said first component for tightening said first component on said measuring pole and a second adjustment screw disposed in said second component for tightening said second component on said measuring pole.

9. The seat adjustment tool for a bicycle according to claim 6, wherein said second component has an opening therein, the opening being disposed to overlie said measurement indicia, whereby said measurement indicia is viewable through said opening.

10. The seat adjustment tool for a bicycle according to claim 6, wherein:
    said second component has an opening therein disposed to overlie said measurement indicia, whereby said measurement indicia is viewable through the opening; and
    said first component is positioned below said second component on said measuring pole.

* * * * *